S. G. RANDALL.
Grain Drill.

No 17,450. Patented June 2, 1857.

UNITED STATES PATENT OFFICE.

SILAS G. RANDALL, OF DIXON, ILLINOIS.

IMPROVEMENT IN SEED-PLANTERS.

Specification forming part of Letters Patent No. 17,450, dated June 2, 1857.

*To all whom it may concern:*

Be it known that I, SILAS G. RANDALL, of Dixon, in the county of Lee and State of Illinois, have invented certain new and useful Improvements in Seed-Planting Harrows; and I do hereby declare the following to be a full, clear, and exact description of the construction and operation of the same, reference being had to the accompanying drawings, making a part thereof, in which—

Figure 1:
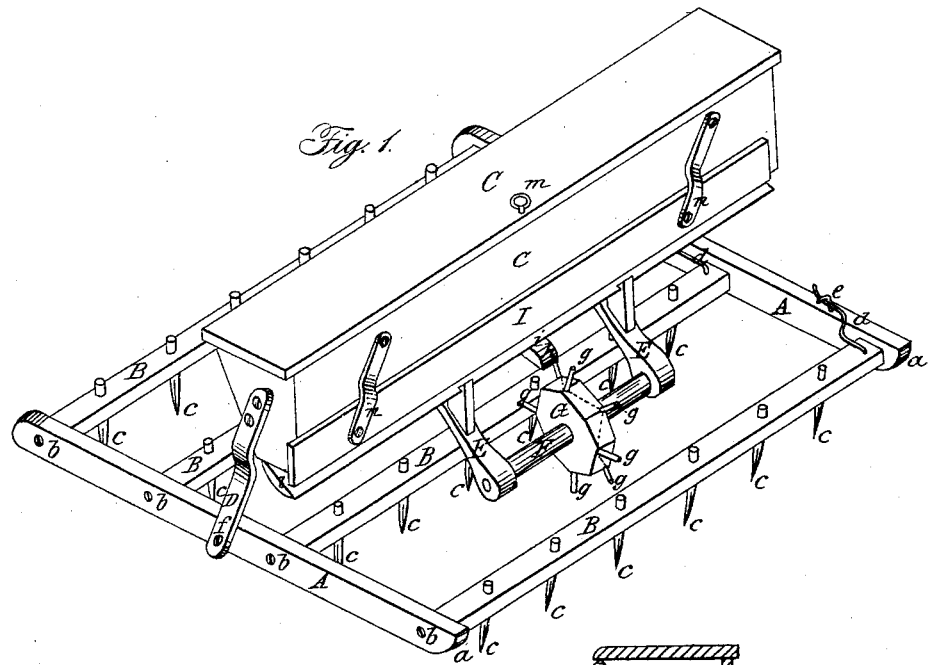
Figure 2:
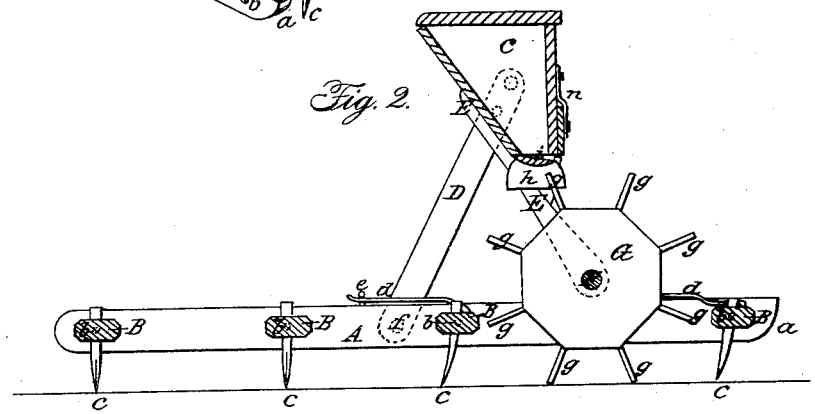
Figure 3:
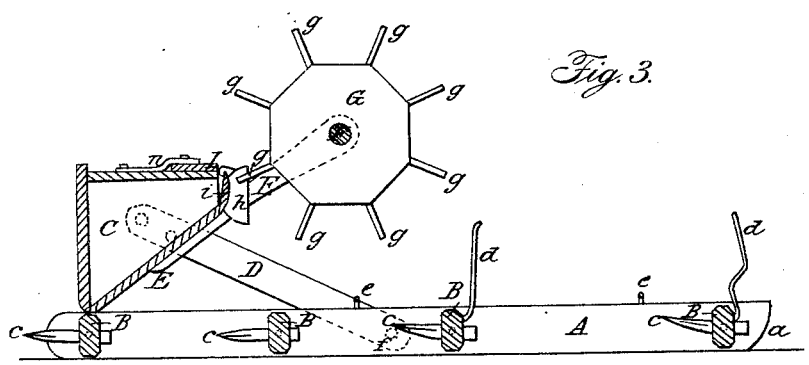

Figure 1 represents a perspective view of the machine. Fig. 2 represents a longitudinal vertical section through the machine, as seen when arranged for sowing; and Fig. 3 represents a similar section of the machine when arranged for transportation from field to field, or when thrown out of seeding action.

Similar letters of reference, where they occur in the several figures, denote like parts of the machine in all of them.

To enable others skilled in the art to make and use my invention, I will proceed to describe the same with reference to the drawings.

A A represent two longitudinal pieces, rounded up at their front ends, $a\ a$, so as to form runners.

B B B B are transverse pieces, pivoted at the points $b\ b$, &c., to the side pieces, so that they may turn on said pivots when it is desired to do so.

$c\ c\ c$ are harrow-teeth inserted in the transverse bars B, said bars and teeth being held in the position shown in Figs. 1 and 2 by an arm, $d$, which takes under a catch, $e$, in the side piece, A, and thus forms a harrow.

When the machine is to be moved from place to place the arm $d$ is taken out from the catch $e$ and the piece B turned a quarter round, as shown in Fig. 3, which throws the harrow-teeth out of action, and the side pieces become supports or runners for sustaining the machine in its transportation.

The seed box or hopper C is hinged to the side pieces, A, by arms D, pivoted thereto at $f$, so that said hopper may freely swing on said arms.

To the front of the hopper are permanently affixed two supporting-pieces, E E, which carry in their lower ends the axle F, upon which is secured the wheel G, furnished with projections $g$, arranged in a zigzag line around its perimeter.

$h$ is a wedge-shaped cam placed on the bottom of the seed-slide $i$. Against the sides of this cam $h$ the teeth $g$ in the wheel G strike alternately, and thus give to said slide a traversing motion in the line of the length of the hopper, the object being to prevent the seed from clogging in the hopper and to make regular sowing.

In front of the seed-hopper C there is a piece, I, suspended by parallel arms $n\ n$, which admit of said piece I moving up or down to open or close the passage through which the seed passes out of the hopper.

The wheel G supports the seed-hopper when the machine is seeding, and the weight of the hopper causes the projections $g$ to enter the ground, and thus insure the turning of said wheel by the forward motion of the machine, and through it the positive action of the seed-slide $i$.

When it is desired to throw the seeding apparatus out of action, the lid of said hopper being first secured by a suitable catch, $m$, the hopper is turned back, as shown in Fig. 3, and rests on the side pieces, A. The wheel G being raised up clear of the ground, of course there is no friction to drive it, and it remains inactive. In this condition the machine is but a harrow.

When the machine is moved from field to field or from place to place the bars B may be turned around, as also shown in Fig. 3, and then it becomes simply a sled or drag for carrying the harrow and seeding apparatus, the harrow being thrown out of action.

The machine as a whole is very cheap and very efficient, as it prepares the ground, sows the seed, and covers it up at one operation, besides forming its own truck upon which it is transported.

Having thus fully described the nature of my invention, what I claim therein as new, and desire to secure by Letters Patent, is—

Hinging the seed-hopper with its drive-wheel G and other appliances connected with it to the side pieces of the harrow by the pivoted arms D, so that when said hopper is thrown forward it shall rest on and be operated by said drive-wheel, which runs on the ground for that purpose, and when thrown back rest on said side pieces and be out of action, as herein set forth and explained.

SILAS G. RANDALL.

Witnesses:
EDWIN W. HINE,
ELLIS I. WILLIAMS.